Sept. 21, 1926. 1,600,803
G. E. DAWSON
LOCOMOTIVE AND TENDER COUPLING
Filed July 2, 1924
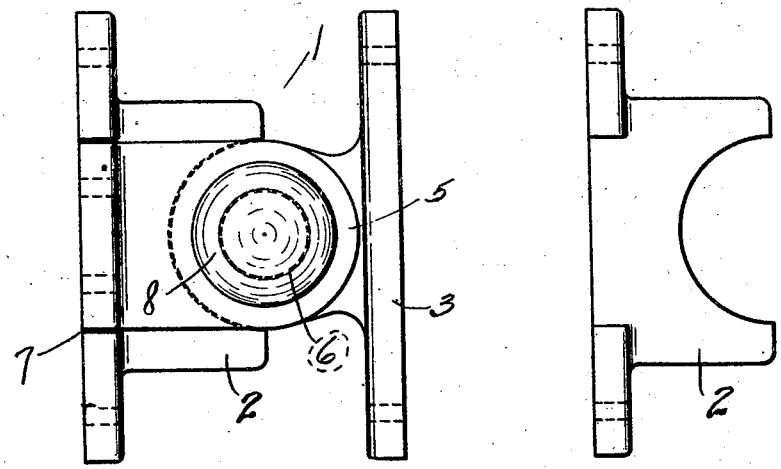
FIG. 1.   FIG. 3.
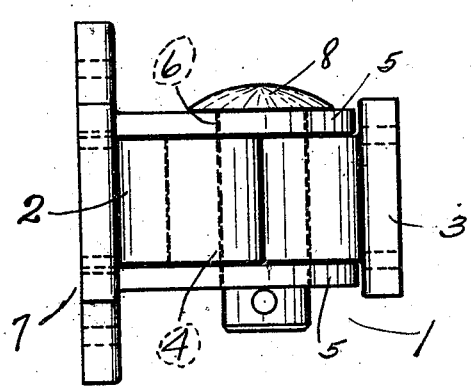   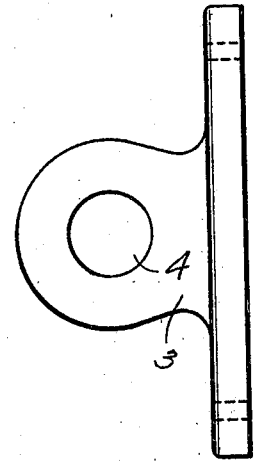
FIG. 2.   FIG. 4.
Inventor
George Edward Dawson
By Adam E. Fisher.
Attorney Patented Sept. 21, 1926.

1,600,803

UNITED STATES PATENT OFFICE.

GEORGE EDWARD DAWSON, OF MONCTON, NEW BRUNSWICK, CANADA.

LOCOMOTIVE AND TENDER COUPLING.

Application filed July 2, 1924. Serial No. 723,734.

This invention is in the way of a locomotive and tender coupling and its object is to provide a coupling that will prevent the locomotive from swaying the tender or the tender from swaying the locomotive when going around a curve.

In the drawing

Figure 1 is a plan view;

Figure 2 is a side elevation;

Figure 3 is a detail of the female half of the coupling;

Figure 4 is a detail of the male half of the coupling.

In carrying out this invention I provide a socket type coupling 1 comprising a female half 2 and a male half 3. The female half 2 is formed with spaced ears 9 at its upper and lower sides, and is bolted or otherwise secured to the locomotive while the male half 3 is bolted or otherwise secured to the tender. A coupling pin aperture 4 is provided in the male half 3 of the coupling 1. Links 5 having apertures 6 provided therein, are bolted or otherwise secured to the locomotive on both sides of the female half 2 of the coupling 1 as shown at 7. The said links 5 are located between the said ears 9 of the female half 2, at the upper and lower sides thereof, and are thus locked by said ears against lateral displacement. A coupling pin 8 is passed through the apertures 6 of the links 5 and the coupling pin aperture 4 of the male half 3 of the coupling 1. The operation of the device is apparent to those skilled in the art, from the foregoing description.

While I have herein described a certain specific method of constructing and assembling the elements of my invention, it is understood same may be varied in minor details, not departing from the spirit of my invention as defined in the appended claim.

I claim:

A device of the kind described, comprising cooperating male and female members adapted to contact and pivot horizontally together, the said female member being formed with spaced ears at its upper and lower sides; the said male member having a coupling pin aperture formed therethrough; flat links adapted to fit between the said spaced ears at the upper and lower sides of the female member, and adapted to overlap the upper and lower sides of the inserted male member, the said links having coupling pin apertures registering with the coupling pin apertures of the male member; the said female member and the said links being adapted for independent attachment to a locomotive; and a coupling pin inserted through the said aligned apertures.

In testimony whereof I affix my signature.

GEORGE EDWARD DAWSON.